US010873627B2

(12) United States Patent
Gleyzer et al.

(10) Patent No.: US 10,873,627 B2
(45) Date of Patent: Dec. 22, 2020

(54) SYSTEM AND METHOD FOR SUPPORTING USE OF AN IN-MEMORY DATA GRID WITH A MULTITENANT APPLICATION SERVER ENVIRONMENT

(71) Applicant: ORACLE INTERNATIONAL CORPORATION, Redwood Shores, CA (US)

(72) Inventors: Gene Gleyzer, Burlington, MA (US); Tim Middleton, Perth (AU); Ballav Bihani, Fremont, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 336 days.

(21) Appl. No.: 14/748,139

(22) Filed: Jun. 23, 2015

(65) Prior Publication Data
US 2015/0373117 A1  Dec. 24, 2015

Related U.S. Application Data

(60) Provisional application No. 62/016,062, filed on Jun. 23, 2014.

(51) Int. Cl.
*H04L 29/08* (2006.01)
*H04L 12/911* (2013.01)
(Continued)

(52) U.S. Cl.
CPC ........ *H04L 67/1097* (2013.01); *G06F 9/5072* (2013.01); *G06F 9/5077* (2013.01);
(Continued)

(58) Field of Classification Search
CPC . H04L 67/1097; H04L 45/566; H04L 47/829; H04L 67/1002; G06F 9/5072
See application file for complete search history.

(56) References Cited

U.S. PATENT DOCUMENTS 7,930,427 B2 *  4/2011  Josefsberg .......... H04L 67/1002
                                                    709/226
8,266,616 B1 *  9/2012  Jacquot .................... G06F 8/65
                                                    717/121
(Continued)

FOREIGN PATENT DOCUMENTS

CN        101639835        2/2010
CN        102170457        8/2011
(Continued)

OTHER PUBLICATIONS

Gracioli et al.; "Cap: Color-Aware Task Partitioning for Multicore Real-Time Applications"; 2014; IEEE Emerging Technology and Factory Automation (ETFA); pp. 1-6 (Year: 2014).*
(Continued)

*Primary Examiner* — Tonia L Dollinger
*Assistant Examiner* — Jihad K Boustany
(74) *Attorney, Agent, or Firm* — Tucker Ellis LLP

(57) ABSTRACT

In accordance with an embodiment, the system supports use of an in-memory data grid or other distributed memory environment, for example Oracle Coherence. A partition provides a runtime and administrative subdivision or slice of an application server domain. An application can be deployed to a particular partition, or otherwise associated with a particular domain partition name. The domain partition name can be used by the data grid to enable a separation of data between different partitions or between tenants associated with those partitions. In some embodiments, one or more data grid services, for example caches and clustered services, can be shared across multiple partitions. Alternatively, the data grid can provide read-shared/write-specific access to data grid services, in which multiple partitions can share an initial set of data, but their subsequent modifications to that data are then isolated from each other.

20 Claims, 8 Drawing Sheets

(51) Int. Cl.
    *H04L 12/721* (2013.01)
    *G06F 9/50* (2006.01)
(52) U.S. Cl.
    CPC .......... *H04L 45/566* (2013.01); *H04L 47/829* (2013.01); *H04L 67/1002* (2013.01)

(56) References Cited

U.S. PATENT DOCUMENTS

| | | | |
|---|---|---|---|
| 8,326,876 B1 | 12/2012 | Venkataraman et al. | |
| 2005/0273490 A1* | 12/2005 | Shrivastava | G06F 11/0715 709/203 |
| 2010/0274910 A1* | 10/2010 | Ghanaie-Sichanie | H04L 63/102 709/229 |
| 2011/0213870 A1* | 9/2011 | Cai | H04L 67/10 709/223 |
| 2011/0314447 A1* | 12/2011 | Malyshev | G06F 8/60 717/110 |
| 2012/0072597 A1 | 3/2012 | Teather et al. | |
| 2013/0151680 A1* | 6/2013 | Salinas | G06F 16/211 709/223 |
| 2013/0254758 A1* | 9/2013 | Walter | G06F 8/61 717/174 |
| 2013/0304788 A1* | 11/2013 | DeLuca | G06F 8/61 709/201 |
| 2015/0207758 A1 | 7/2015 | Mordani et al. | |
| 2015/0370549 A1 | 12/2015 | Zhang et al. | |
| 2015/0370608 A1 | 12/2015 | Dipol et al. | |
| 2015/0372883 A1 | 12/2015 | Lam et al. | |
| 2015/0372887 A1 | 12/2015 | Inamdar et al. | |
| 2015/0372936 A1 | 12/2015 | Kasso et al. | |
| 2015/0372937 A1 | 12/2015 | Lai et al. | |
| 2015/0373004 A1 | 12/2015 | Hopkins et al. | |
| 2015/0373097 A1 | 12/2015 | Konkus et al. | |
| 2015/0373098 A1 | 12/2015 | Mordani et al. | |
| 2015/0373099 A1 | 12/2015 | Dipol et al. | |
| 2015/0378641 A1 | 12/2015 | Patel et al. | |
| 2015/0378938 A1 | 12/2015 | Patel et al. | |
| 2016/0013983 A1 | 1/2016 | Lu et al. | |
| 2016/0014038 A1 | 1/2016 | Thyagarajan et al. | |
| 2016/0014191 A1 | 1/2016 | Liu et al. | |
| 2016/0014212 A1 | 1/2016 | Zhang et al. | |
| 2016/0020949 A1 | 1/2016 | Mares et al. | |
| 2016/0085543 A1 | 3/2016 | Islam et al. | |
| 2016/0088108 A1 | 3/2016 | Felts et al. | |
| 2016/0092278 A1 | 3/2016 | Quinn et al. | |
| 2016/0092319 A1 | 3/2016 | Parkinson et al. | |
| 2016/0092342 A1 | 3/2016 | Inamdar et al. | |
| 2016/0094385 A1 | 3/2016 | Bower et al. | |
| 2016/0094403 A1 | 3/2016 | Somogyi et al. | |
| 2016/0094404 A1 | 3/2016 | Kasso et al. | |
| 2016/0094405 A1 | 3/2016 | Barnes et al. | |
| 2016/0094406 A1 | 3/2016 | Phan et al. | |
| 2016/0094407 A1 | 3/2016 | Parkinson et al. | |
| 2016/0094408 A1 | 3/2016 | Segu | |
| 2016/0094473 A1 | 3/2016 | Mordani et al. | |
| 2016/0094474 A1 | 3/2016 | Sahoo et al. | |
| 2016/0094478 A1 | 3/2016 | Quinn et al. | |
| 2016/0094484 A1 | 3/2016 | Mordani et al. | |
| 2016/0094486 A1 | 3/2016 | Sahoo et al. | |
| 2016/0094498 A1 | 3/2016 | Xiao et al. | |
| 2016/0094510 A1 | 3/2016 | Xiao et al. | |
| 2016/0094582 A1 | 3/2016 | Watson et al. | |
| 2016/0094583 A1 | 3/2016 | Bower | |
| 2016/0094624 A1 | 3/2016 | Mordani et al. | |
| 2016/0094625 A1 | 3/2016 | Sengodan et al. | |
| 2016/0094626 A1 | 3/2016 | Bajaj et al. | |
| 2016/0094627 A1 | 3/2016 | Subramanyam et al. | |
| 2016/0094635 A1 | 3/2016 | Kannan et al. | |
| 2016/0094647 A1 | 3/2016 | Mordani et al. | |
| 2016/0142506 A1 | 5/2016 | Sahoo et al. | |
| 2016/0231998 A1 | 8/2016 | Islam et al. | |
| 2016/0328268 A1 | 11/2016 | Islam et al. | |
| 2017/0017494 A1 | 1/2017 | Patel et al. | |
| 2017/0019467 A1 | 1/2017 | Inamdar et al. | |
| 2017/0019485 A1 | 1/2017 | Dorr et al. | |
| 2017/0034071 A1 | 2/2017 | Sidde et al. | |
| 2017/0116041 A1 | 4/2017 | Nanjudaswamy | |
| 2017/0118137 A1 | 4/2017 | Nanjudaswamy | |
| 2017/0126742 A1 | 5/2017 | Hopkins et al. | |
| 2017/0192772 A1 | 7/2017 | Islam et al. | |

FOREIGN PATENT DOCUMENTS

| | | |
|---|---|---|
| CN | 102333115 | 1/2012 |
| CN | 102571821 | 7/2012 |
| CN | 102609271 | 7/2012 |
| CN | 102932404 | 2/2013 |
| CN | 102932405 | 2/2013 |
| CN | 103455512 | 12/2013 |
| CN | 102571916 | 11/2015 |

OTHER PUBLICATIONS

Chinese Patent Office, Office Action for Chinese Application No. 201580003512.6 dated Jul. 20, 2018, 8 pages.
Indian Patent Office, First Examination Report dated Jun. 22, 2020 for Indian Patent Application No. 201647017709, 6 pages.
Communication pursuant to Article 94(3) EPC, dated Apr. 23, 2019 for EP Application No. 15704133.6, 4 pages.
United States Patent and Trademark Office, Notice of Allowance dated Aug. 9, 2019 for U.S. Appl. No. 15/948,721, 18 pages.
United States Patent and Trademark Office, Notice of Allowance dated Dec. 16, 2019 for U.S. Appl. No. 15/948,721, 18 pages.
United States Patent and Trademark Office, Notice of Allowance dated Mar. 27, 2020 for U.S. Appl. No. 15/948,721, 18 pages.

* cited by examiner

US 10,873,627 B2

SYSTEM AND METHOD FOR SUPPORTING USE OF AN IN-MEMORY DATA GRID WITH A MULTITENANT APPLICATION SERVER ENVIRONMENT

CROSS-REFERENCE TO RELATED APPLICATIONS

This application claims the benefit of priority to U.S. Provisional Application titled "SYSTEM AND METHOD FOR SUPPORTING USE OF IN-MEMORY DATA GRIDS WITH A MULTITENANT APPLICATION SERVER ENVIRONMENT", Application No. 62/016,062, filed Jun. 23, 2014; and is related to U.S. patent application titled "SYSTEM AND METHOD FOR SUPPORTING MULTI-TENANCY IN AN APPLICATION SERVER, CLOUD, OR OTHER ENVIRONMENT", application Ser. No. 14/601,883, filed Jan. 21, 2015; each of which above applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to application servers and cloud environments, and are particularly related to a system and method for supporting use of an in-memory data grid with a multitenant application server environment.

BACKGROUND

Application servers generally provide a managed environment within which software applications can be deployed and run. Cloud-based environments allow applications to run within and take advantage of the distributed resources provided by a cloud. Such environments can support large numbers of users or tenants, some of which may have specific requirements that are particular to that user or tenant. These are some examples of the type of environments in which embodiments of the present invention can be used.

SUMMARY

In accordance with an embodiment, the system supports use of an in-memory data grid or other distributed memory environment, for example Oracle Coherence. A partition provides a runtime and administrative subdivision or slice of an application server domain. An application can be deployed to a particular partition, or otherwise associated with a particular domain partition name. The domain partition name can be used by the data grid to enable a separation of data between different partitions or between tenants associated with those partitions. In some embodiments, one or more data grid services, for example caches and clustered services, can be shared across multiple partitions. Alternatively, the data grid can provide read-shared/write-specific access to data grid services, in which multiple partitions can share an initial set of data, but their subsequent modifications to that data are then isolated from each other.

DETAILED DESCRIPTION

In accordance with an embodiment, the system supports use of an in-memory data grid or other distributed memory environment, for example Oracle Coherence. A partition provides a runtime and administrative subdivision or slice of an application server domain. An application can be deployed to a particular partition, or otherwise associated with a particular domain partition name. The domain partition name can be used by the data grid to enable a separation of data between different partitions or between tenants associated with those partitions.

Application Server (e.g., Multi-Tenant, MT) Environment

Figure 1:
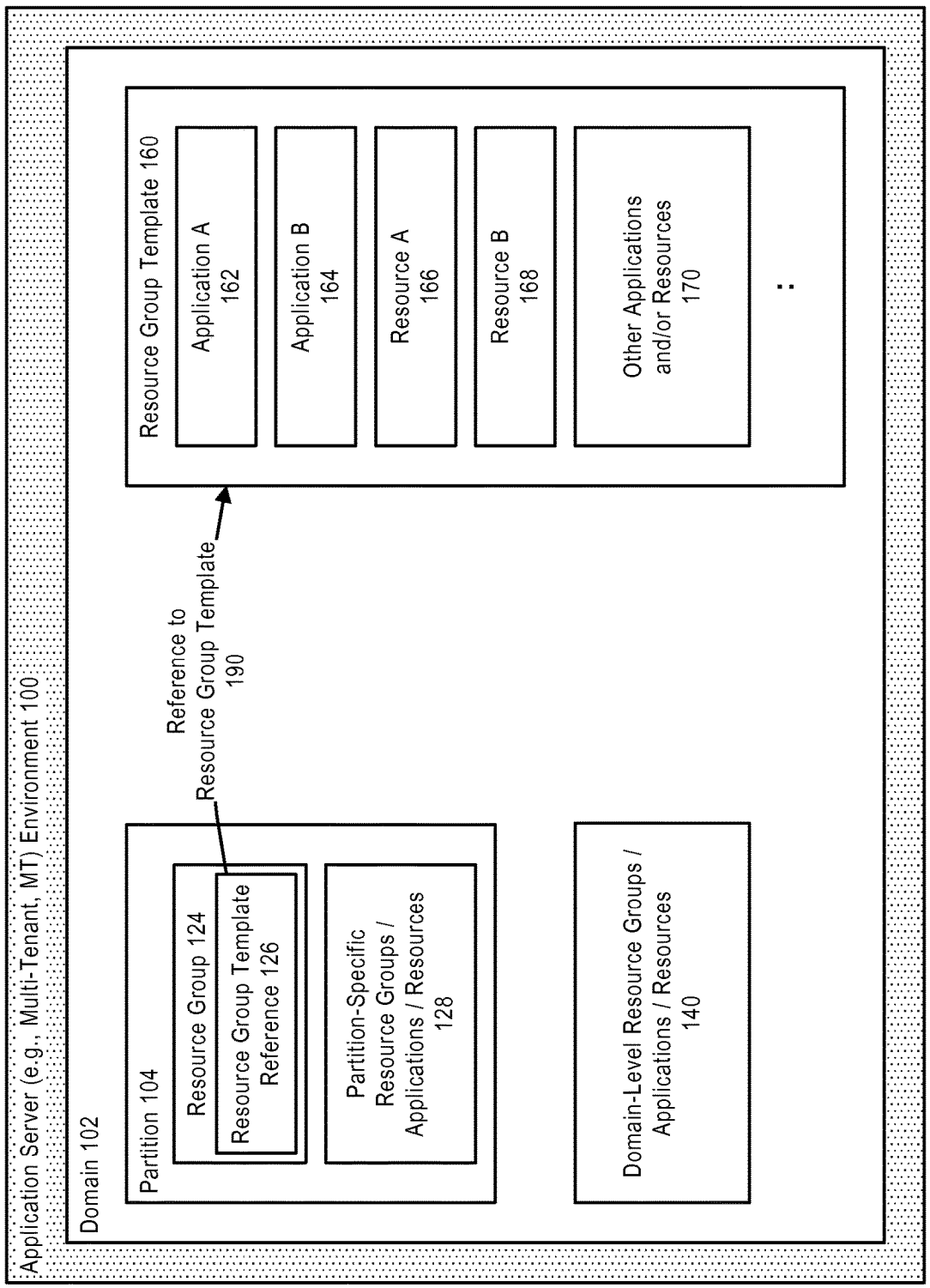
FIG. 1 illustrates a system for supporting multi-tenancy in an application server, cloud, or other environment, in accordance with an embodiment.

FIG. 1 illustrates a system for supporting multi-tenancy in an application server, cloud, or other environment, in accordance with an embodiment.

As illustrated in FIG. 1, in accordance with an embodiment, an application server (e.g., multi-tenant, MT) environment 100, or other computing environment which enables the deployment and execution of software applications, can be configured to include and operate according to a domain 102 configuration that is used at runtime to define an application server domain.

In accordance with an embodiment, the application server can include one or more partitions 104 that are defined for use at runtime. Each partition can be associated with a globally unique partition identifier (ID) and partition configuration, and can further include one or more resource groups 124, together with a reference to a resource group template 126 and/or partition-specific applications or resources 128. Domain-level resource groups, applications and/or resources 140 can also be defined at the domain level, optionally with a reference to a resource group template.

Each resource group template 160 can define one or more applications A 162, B 164, resources A 166, B 168, and/or other deployable applications or resources 170, and can be referenced by a resource group. For example, as illustrated in FIG. 1, resource group 124 in partition 104 can reference 190 resource group template 160.

Generally, a system administrator can define partitions, domain-level resource groups and resource group templates, and security realms; while a partition administrator can define aspects of their own partition, for example, by creating partition-level resource groups, deploying applications to the partition, or referencing specific realms for the partition.

Figure 2:
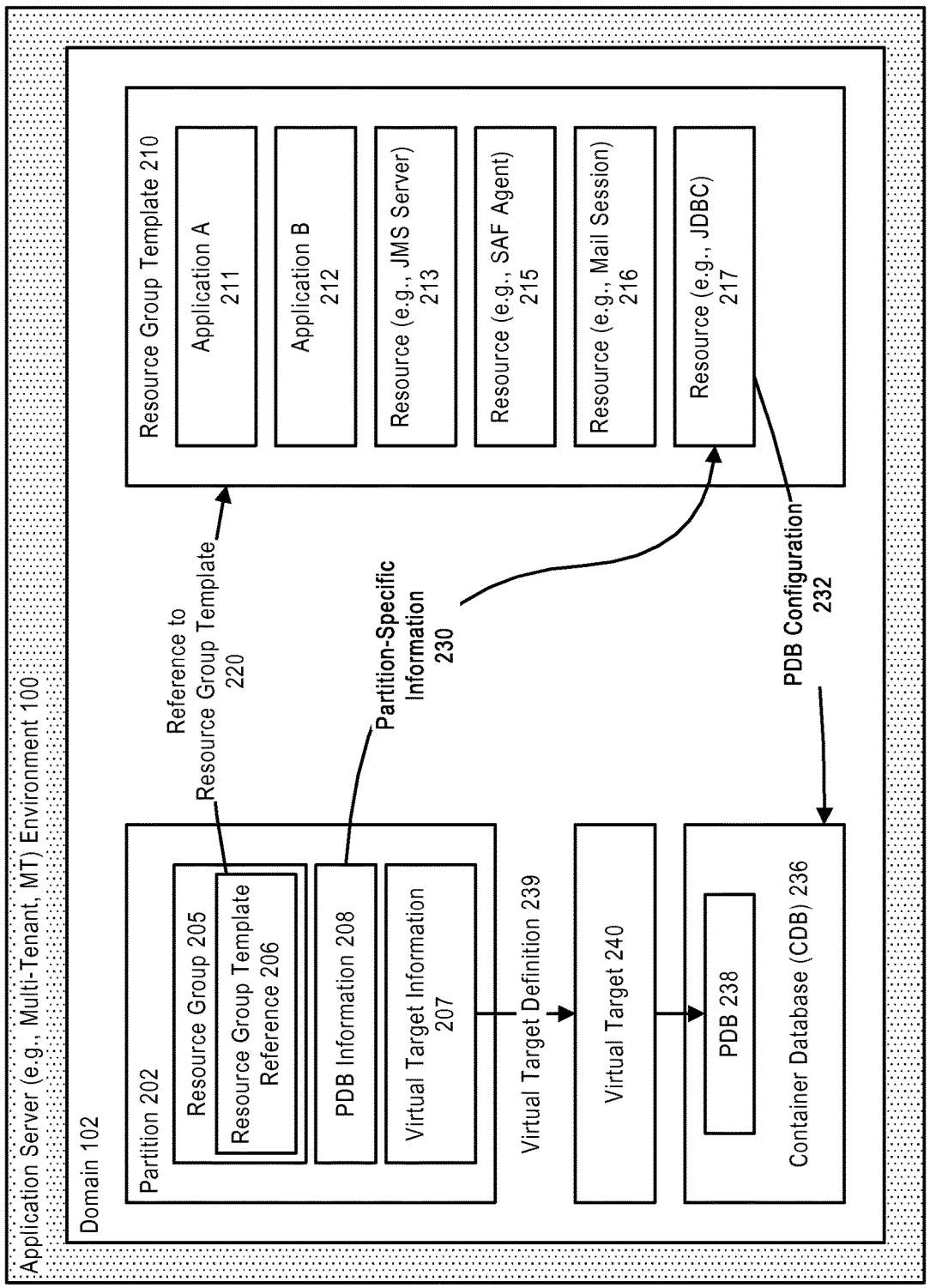
FIG. 2 further illustrates a system for supporting multi-tenancy in an application server, cloud, or other environment, in accordance with an embodiment.

FIG. 2 further illustrates a system for supporting multi-tenancy in an application server, cloud, or other environment, in accordance with an embodiment.

As illustrated in FIG. 2, in accordance with an embodiment, a partition 202 can include, for example, a resource group 205 which includes a reference 206 to a resource group template 210, a virtual target (e.g., virtual host) information 207, and a pluggable database (PDB) information 208. A resource group template (e.g., 210) can define, for example, a plurality of applications A 211 and B 212, together with resources such as a Java Message Server (JMS) server 213, store-and-forward (SAF) agent 215, mail session component 216, or Java Database Connectivity (JDBC) resource 217.

The resource group template illustrated in FIG. 2 is provided by way of example; in accordance with other embodiments, different types of resource group templates and elements can be provided.

In accordance with an embodiment, when a resource group within a partition (e.g., 202) references 220 a particular resource group template (e.g., 210), information associated with a particular partition can be used in combination with the referenced resource group template, to indicate a partition-specific information 230, for example a partition-specific PDB information. The partition-specific information can then be used by the application server to configure resources, for example a PDB resource, for use by the partition. For example, partition-specific PDB information associated with partition 202 can be used, by the application server, to configure 232 a container database (CDB) 236 with an appropriate PDB 238, for use by that partition.

Similarly, in accordance with an embodiment, a virtual target information associated with a particular partition can be used to define 239 a partition-specific virtual target 240, for use by the partition, e.g., baylandurgentcare.com, which can then be made accessible via a uniform resource locator (URL), e.g., http://baylandurgentcare.com.

Figure 3:
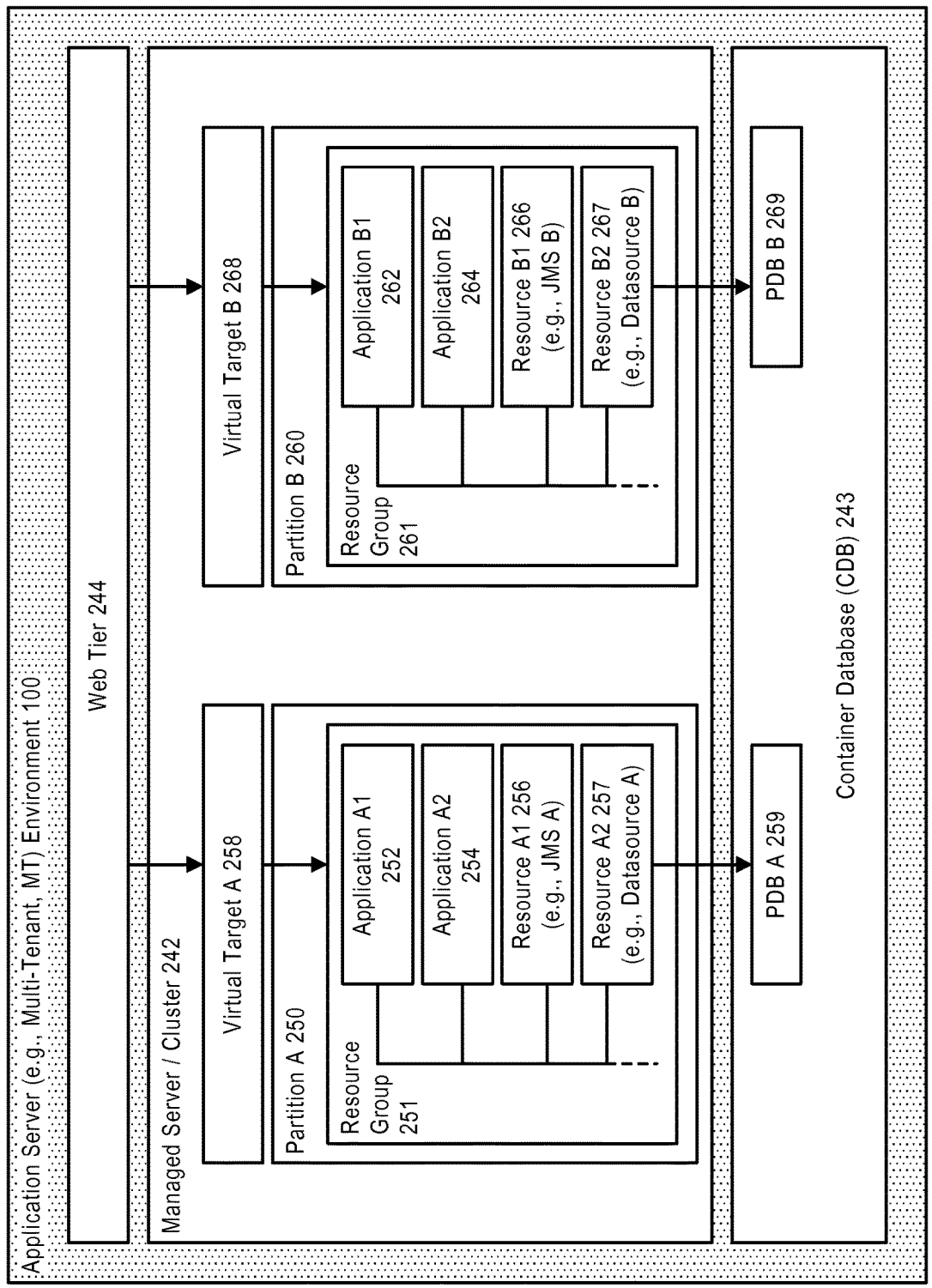
FIG. 3 further illustrates a system for supporting multi-tenancy in an application server, cloud, or other environment, in accordance with an embodiment.

FIG. 3 further illustrates a system for supporting multi-tenancy in an application server, cloud, or other environment, in accordance with an embodiment.

In accordance with an embodiment, a system configuration such as a config.xml configuration file, is used to define a partition, including configuration elements for resource groups associated with that partition, and/or other partition properties. Values can be specified per-partition using property name/value pairs.

In accordance with an embodiment, a plurality of partitions can be executed within a managed server/cluster 242, or a similar environment which can provide access to a CDB 243, and which are accessible via a web tier 244. This allows, for example, a domain or partition to be associated with one or more of the PDBs (of the CDB).

In accordance with an embodiment, each of the plurality of partitions, in this example partition A 250 and partition B 260, can be configured to include a plurality of resources associated with that partition. For example, partition A can be configured to include a resource group 251 which contains an application A1 252, application A2 254, and JMS A 256, together with a datasource A 257 associated with PDB A 259, wherein the partition is accessible via a virtual target A 258. Similarly, partition B 260 can be configured to include a resource group 261 which contains an application B1 262, application B2 264, and JMS B 266, together with a datasource B 267 associated with PDB B 269, wherein the partition is accessible via a virtual target B 268.

While several of the above examples illustrate use of CDB and PDBs, in accordance with other embodiments, other types of multi-tenant or non-multi-tenant databases can be supported, wherein a particular configuration can be provided for each partition, for example through the use of schemas, or the use of different databases.

Resources

In accordance with an embodiment, a resource is a system resource, application, or other resource or object that can be deployed to a domain of the environment. For example, in accordance with an embodiment, a resource can be an application, JMS, JDBC, JavaMail, WLDF, data source, or other system resource or other type of object that can be deployed to a server, cluster, or other application server target.

Partitions

In accordance with an embodiment, a partition is a runtime and administrative subdivision or slice of a domain that can be associated with a partition identifier (ID) and configuration, and can contain applications and/or refer to domain-wide resources through the use of resource groups and resource group templates.

Generally, a partition can contain its own applications, refer to domain wide applications via resource group templates, and have its own configuration. Partitionable entities can include resources, for example JMS, JDBC, JavaMail, WLDF resources, and other components, such as JNDI namespace, network traffic, work managers, and security policies and realms. In the context of a multi-tenant environment, the system can be configured to provide tenant access to the administrative and runtime aspects of partitions associated with a tenant.

In accordance with an embodiment, each resource group within a partition can optionally reference a resource group template. A partition can have multiple resource groups, and each of them can reference a resource group template. Each partition can define properties for configuration data that is not specified in the resource group templates to which the partition's resource groups refer. This enables the partition to act as a binding of deployable resources defined in a resource group template, to specific values for use with that partition. In some cases, a partition can override configuration information specified by a resource group template.

In accordance with an embodiment, a partition configuration, as defined for example by a config.xml configuration file, can include a plurality of configuration elements, for example: "partition", which contains the attributes and child elements that define the partition; "resource-group", which contains the applications and resources deployed to the partition; "resource-group-template", which contains applications and resources defined by that template; "jdbc-system-resource-override", which contains a database-specific service name, user name, and password; and "partition-properties", which contains property key values that can be used for macro replacement in resource group templates.

Upon startup, the system can use the information provided by the configuration file to generate partition-specific configuration elements for each resource, from the resource group template.

Resource Groups

In accordance with an embodiment, a resource group is a named, fully-qualified collection of deployable resources that can be defined either at a domain or partition level, and can reference a resource group template. The resources in a resource group are considered fully-qualified in that the administrator has provided all of the information needed to start or connect to those resources, for example the credentials for connecting to a data source, or the targeting information for a application.

A system administrator can declare resource groups at the domain level, or at the partition level. At the domain level, a resource group provides a convenient way to group related resources. The system can manage resources declared in a domain-level resource group the same as ungrouped resources, so that the resources can be started during system start-up, and stopped during system shut-down. An administrator can also stop, start, or remove a resource in a group individually, and can act on all the resources in a group implicitly by operating on the group. For example, stopping a resource group stops all of the resources in the group that are not already stopped; starting the resource group starts any resources in the group that are not already started; and removing the resource group removes all of the resources contained in the group.

At the partition level, a system or partition administrator can configure zero or more resource groups in a partition, subject to any security restrictions. For example, in a SaaS use case, various partition-level resource groups can refer to domain-level resource group templates; while in a PaaS use case, partition-level resource groups can be created that do not refer to resource group templates, but instead represent applications and their related resources that are to be made available within that partition only.

In accordance with an embodiment, resource grouping can be used to group together applications and the resources they use as a distinct administrative unit within the domain. For example, in the medical records (MedRec) application described below, a resource grouping defines the MedRec application and its resources. Multiple partitions can run the same MedRec resource group, each using a partition-specific configuration information, such that the applications that are part of each MedRec instance are made specific to each partition.

Resource Group Templates

In accordance with an embodiment, a resource group template is a collection of deployable resources that are defined at a domain level, that can be referenced from a resource group, and some of the information required to activate its resources may not be stored as part of the template itself, such that it supports the specification of partition level configuration. A domain can contain any number of resource group templates, each of which can include, for example, one or more related Java applications and the resources on which those applications depend. Some of the information about such resources may be the same across all partitions, while other information may vary from one partition to the next. Not all configuration need be specified at the domain level—partition level configuration can instead be specified in the resource group template through the use of macros, or property name/value pairs.

In accordance with an embodiment, a particular resource group template can be referenced by one or more resource groups. Generally, within any given partition, a resource group template can be referenced by one resource group at a time, i.e., not simultaneously by multiple resource groups within the same partition; however, it can be referenced at the same time by another resource group in a different partition. The object containing the resource group, e.g., the domain or partition, can use property name/value assignments to set the value of any tokens in the resource group template. When the system activates a resource group template using a referencing resource group, it can replace those tokens with values set in the resource group's containing object. In some cases, the system can also use statically-configured resource group templates and partitions to generate runtime configuration for each partition/template combination.

For example, in a SaaS use case, the system can activate the same applications and resources multiple times, including once for each partition that will use them. When an administrator defines a resource group template they can use tokens to represent the information that will be supplied elsewhere. For example, the username to use in connecting to a CRM-related data resource can be indicated in the resource group template as \${CRMDataUsername}.

Tenants

In accordance with an embodiment, in a multi-tenant environment, such as a multi-tenant (MT) application server environment, a tenant is an entity that can be represented by, or otherwise associated with, one or more partitions and/or one or more tenant-aware applications.

For example, tenants can represent distinct user organizations, such as different external companies, or different departments within a particular enterprise (e.g., HR and Finance departments), each of which can be associated with a different partition. A tenant globally unique identity (tenant ID) is the association of a particular user, at a particular moment in time, with a particular tenant. The system can derive which tenant a particular user belongs to from the user identity, for example by referring to a user identity store. The user identity enables the system to enforce those actions that a user is authorized to perform, including, but not limited to, which tenant the user may belong.

In accordance with an embodiment, the system enables isolation of the administration and runtime of different tenants from each other. For example, tenants can configure some behaviors of their applications, and resources to which they have access. The system can ensure that a particular tenant cannot administer artifacts belonging to another tenant; and, at runtime, that the applications working on behalf of a particular tenant refer only to resources associated with that tenant, and not to resources associated with other tenants.

In accordance with an embodiment, a tenant-unaware application is one that contains no logic dealing with tenants explicitly, such that any resources that the application uses may be accessible regardless of what user submitted a request to which the application is responding. In contrast, a tenant-aware application includes logic that explicitly deals with tenants. For example, based on a user's identity the application can derive the tenant to which the user belongs and use that information to access tenant-specific resources.

In accordance with an embodiment, the system enables users to deploy applications that are explicitly written to be tenant-aware, so that application developers can obtain the tenant ID of a current tenant. The tenant-aware application can then use the tenant ID to handle multiple tenants that are using a single instance of the application.

For example, the MedRec application, which supports a single doctor's office or hospital, can be exposed to two different partitions or tenants, e.g., a Bayland Urgent Care tenant, and a Valley Health tenant, each of which is able to access separate tenant-specific resources, such as separate PDBs, without changing the underlying application code.

Exemplary Domain Configuration and Multi-Tenant Environment

In accordance with an embodiment, applications can be deployed to a resource group template at the domain level, or to a resource group that is scoped to a partition or scoped to the domain. Application configuration can be overridden using deployment plans specified per-application, or per-partition. Deployment plans can also be specified as part of a resource group.

Figure 4:
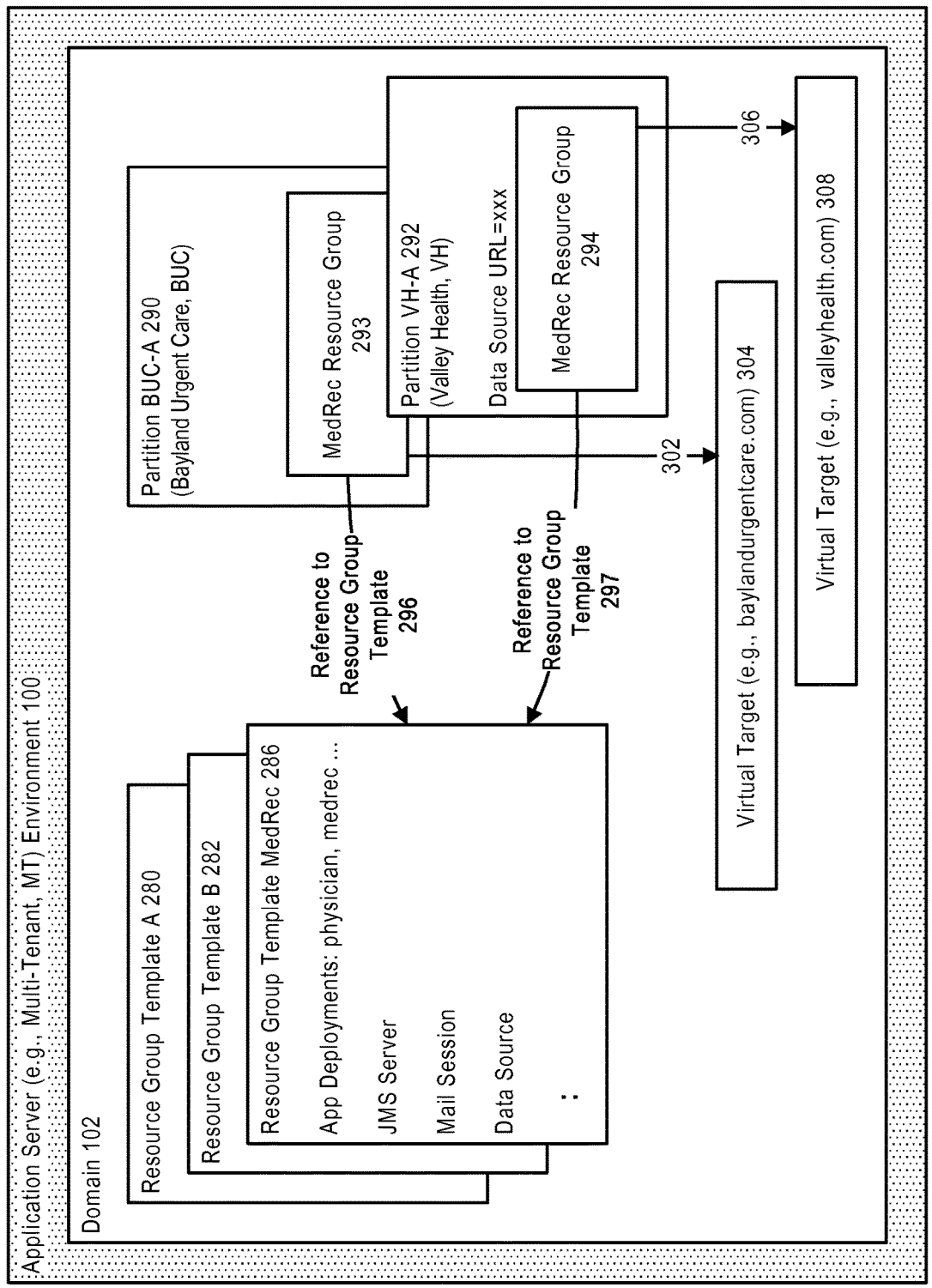
FIG. 4 illustrates a domain configuration for use with an exemplary multi-tenant environment, in accordance with an embodiment.

FIG. 4 illustrates a domain configuration for use with an exemplary multi-tenant environment, in accordance with an embodiment.

In accordance with an embodiment, when the system starts a partition, it creates virtual targets (e.g., virtual hosts) and connection pools, including one for each partition, to respective database instances, according to the provided configuration.

Typically, each resource group template can include one or more related applications and the resources on which those applications depend. Each partition can provide configuration data that is not specified in the resource group templates to which it refers, by providing a binding of the deployable resources in resource group templates to specific values associated with the partition; including, in some cases, overriding certain configuration information specified by the resource group template. This enables the system to activate an application represented by a resource group template differently for each partition, using the property values each partition has defined.

In some instances, a partition may contain resource groups that do not refer to resource group templates, or that directly define their own partition-scoped deployable resources. Applications and data sources that are defined within a partition are generally available only to that partition. Resources can be deployed so that they can be accessed from across partitions using partition:<partitionName>/<resource JNDI name>, or domain:<resource JNDI name>.

For example, a MedRec application can include a plurality of Java applications, a data source, a JMS server, and a mail session. To run the MedRec application for multiple tenants, the system administrator can define a single MedRec resource group template 286, declaring those deployable resources in the template.

In contrast to domain-level deployable resources, the deployable resources declared in a resource group template may not be fully configured in the template, or cannot be activated as-is, since they lack some configuration information.

For example, the MedRec resource group template may declare a data source used by the applications, but it may not specify a URL for connecting to the database. Partitions associated with different tenants, for example, partition BUC-A 290 (Bayland Urgent Care, BUC) and partition VH-A 292 (Valley Health, VH) can reference one or more resource group templates, by each including a MedRec resource group 293, 294 that references 296, 297 the MedRec resource group template. The reference can then be used to create 302, 306, the virtual targets/virtual hosts for each tenant, including a virtual host baylandurgentcare.com 304 associated with the BUC-A partition, for use by the Bayland Urgent Care tenant; and a virtual host valleyhealth.com 308 associated with the VH-A partition, for use by the Valley Health tenant.

Figure 5:
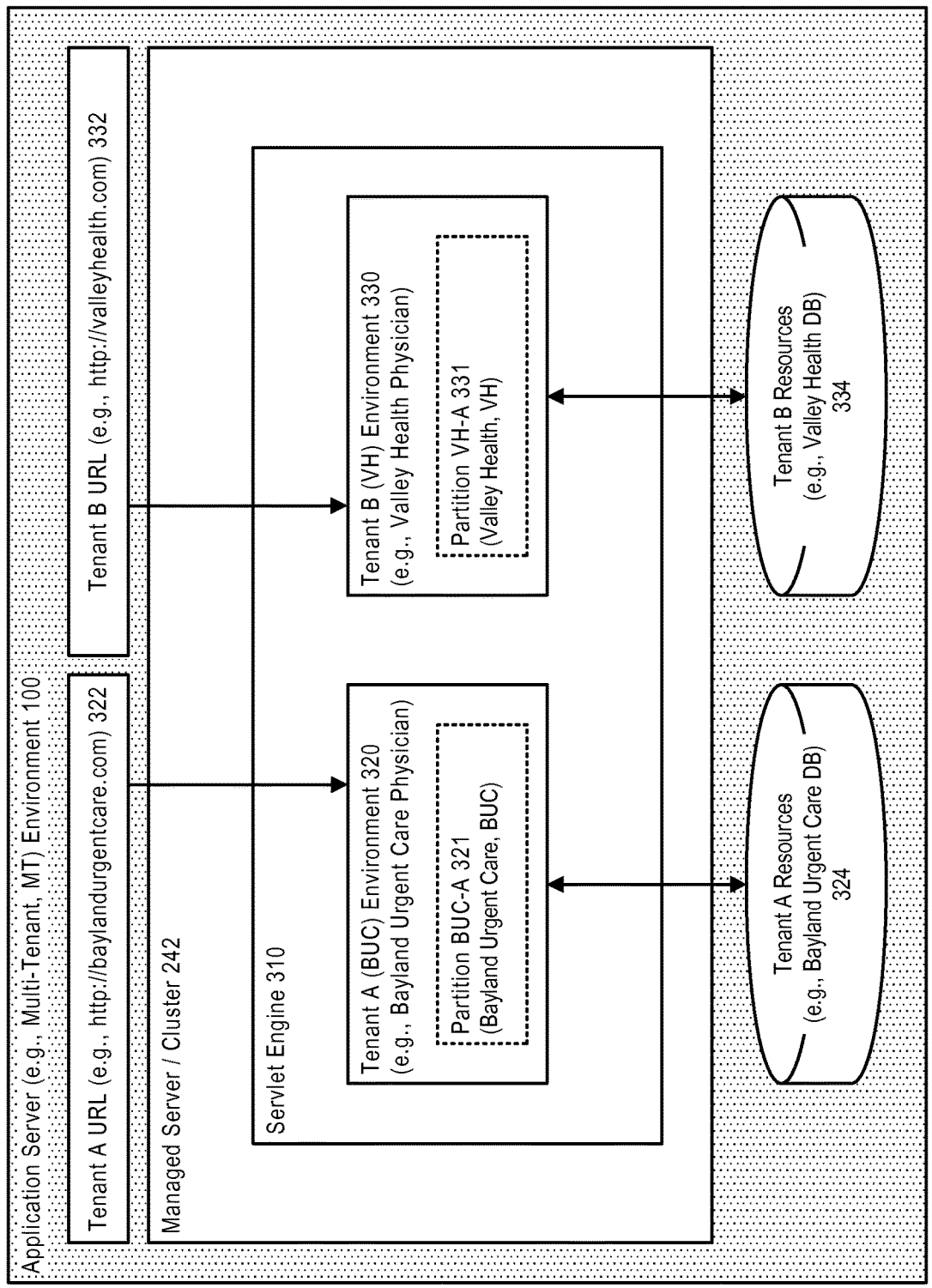
FIG. 5 further illustrates an exemplary multi-tenant environment, in accordance with an embodiment.

FIG. 5 further illustrates an exemplary multi-tenant environment, in accordance with an embodiment. As illustrated in FIG. 5, and continuing the example from above, in which two partitions reference the MedRec resource group template, in accordance with an embodiment, a servlet engine 310 can be used to support a plurality of tenant environments, in this example a Bayland Urgent Care Physician tenant environment 320, and a Valley Health Physician tenant environment 330.

In accordance with an embodiment, each partition 321, 331 can define a different virtual target on which to accept incoming traffic for that tenant environment, and a different URL 322, 332 for connecting to the partition and to its resources 324, 334, including in this example either a bayland urgent care database, or a valley health database respectively. The database instances can use compatible schemas, since the same application code will execute against both databases. When the system starts the partitions, it can create the virtual targets and connection pools to the respective database instances.

Support for In-Memory Data Grids

In accordance with an embodiment, the system supports use of an in-memory data grid or other distributed memory environment, for example Oracle Coherence. An application can be deployed to a particular partition, or otherwise associated with a particular domain partition name. The domain partition name can be used by the data grid to enable a separation of data between different partitions or between tenants associated with those partitions.

Figure 6:
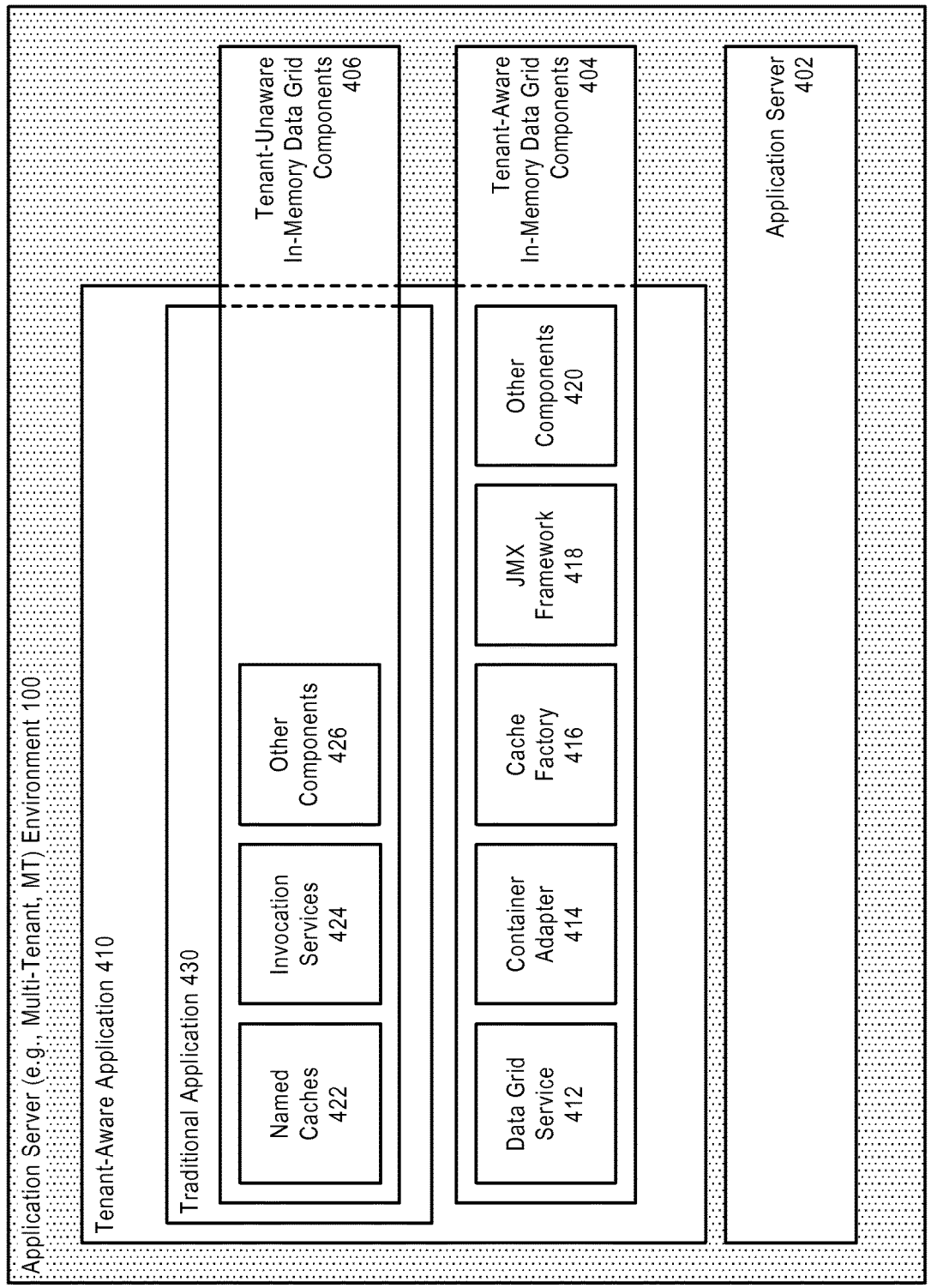
FIG. 6 illustrates the use of an in-memory data grid with a multitenant application server environment, in accordance with an embodiment.

FIG. 6 illustrates the use of an in-memory data grid with a multitenant application server 402 environment, in accordance with an embodiment. As shown in FIG. 6, the data grid can include a plurality of tenant-aware components 404 such as, for example, a data grid service 412, container adapter 414, cache factory 416, JMX framework 418, or other tenant-aware components 420. When used with a tenant-aware application 410, each tenant-aware component can determine a current domain partition on whose behalf that component is working, and operate accordingly.

Other data grid components 406 may not be tenant-aware, for example, named caches 422, invocation services 424, or other non-tenant-aware components 426, such that a traditional (non-tenant-aware) application 430 need not be aware of any tenant-aware functionalities.

Figure 7:
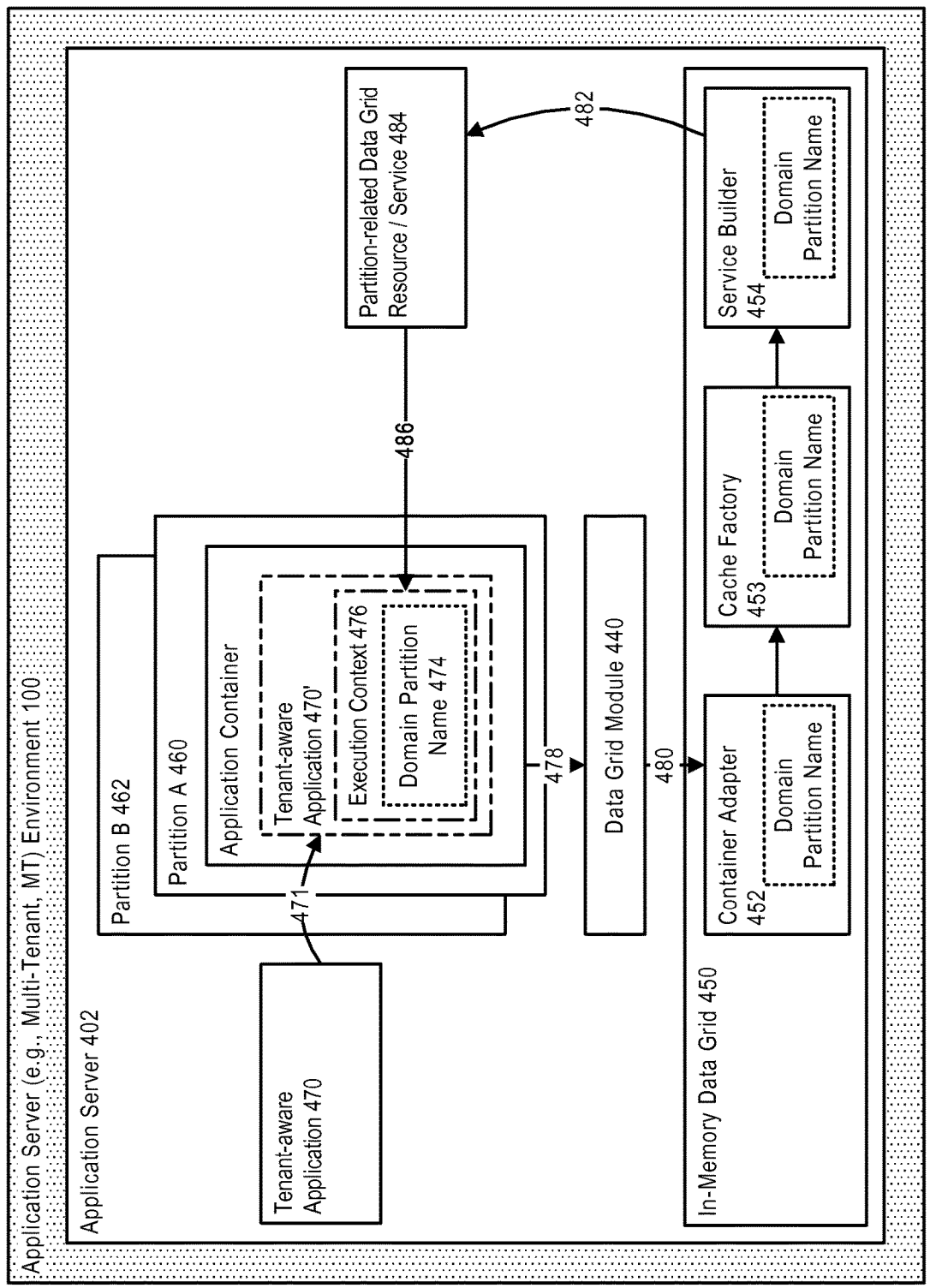
FIG. 7 further illustrates the use of an in-memory data grid with a multitenant application server environment, in accordance with an embodiment.

FIG. 7 further illustrates the use of an in-memory data grid with a multitenant application server environment, in accordance with an embodiment. As shown in FIG. 7, the application server can include a data grid module (e.g., CoherenceModule) 440 that enables access to the data grid 450. A container adapter (e.g., ContainerAdapter) 452, cache factory (e.g., ExtensibleConfigurable CacheFactory) 453, and service builder (e.g., ServiceBuilder) 454 together enable the creation of services for use by applications.

In accordance with an embodiment, each of a plurality of partitions, for example partition A 460 and partition B 462, can contain its own applications. When a tenant-aware application 470 is deployed 471 to a partition, or is otherwise associated with a particular partition, a domain partition name 474 can be included in the application's execution context 476, so that the data grid's tenant-aware components can obtain the domain partition name, using an appropriate interface.

From the perspective of the data grid's cluster management or grid service tiers, the domain partition name can be treated as part of a data grid service name, and handled without changes to the data grid's service discovery or join protocols, or service configuration logic. The incorporation of a domain partition name can be used to enable service-level isolation, or partition-related MBean categorization.

For example, during an application deployment "prepare" phase, a domain partition name can be provided 478 by the application container, via the data grid module 480, to the data grid's container adapter constructor.

During an "activate" phase, the container adapter can inject the domain partition name into the cache factory, which in turn passes any provided domain partition name to service builder instances, where they can be used to decorate 482 the names of one or more partition-related data grid resources or services 484, for use 486 by the deployed application.

Data Grid JMX Framework

In accordance with an embodiment, a domain partition name can also be used by the data grid during MBean registration. For example, in a non-tenant-aware environment, service-scoped MBean types may use the following naming convention:

```
Coherence:type=Service,name=[service-name], . . .
Coherence:type=Cache,service=[service-name],
name=[cache-name], . . .
Coherence:type=StorageManager,service=[service-name],
name=[cache-name], . . .
Coherence:type=PartitionAssignment,service=[service-name], . . .
Coherence:type=PersistenceSnapshot,service=[service-name], . . .
Coherence:type=Federation,service=[service-name], . . .
```

Which, if a domain partition name is provided, can be modified as:

```
Coherence:type=Service,domainPartition=[domain-partition-name],
name=[service-name], . . .
Coherence:type=Cache,domainPartition=[domain-partition-
name],service=[servicename],
name=[cache-name], . . .
Coherence:type=StorageManager,domainPartition=[domain-partition-
name],service=[servicename],
name=[cache-name], . . .
Coherence:type=PartitionAssignment,domainPartition=[domain-partition-
name],service=[servicename], . . .
Coherence:type=PersistenceSnapshot,domainPartition=[domain-partition-
name],service=[servicename], . . .
Coherence:type=Federation,domainPartition=[domain-partition-
name],service=[service-name] . . .
```

Propagation of Domain Partition Name

In accordance with an embodiment, each application server or data grid component, that performs work on behalf of a tenant, and dispatches work to another thread, must propagate the domain partition name to the new thread, where the domain partition name can then be accessed by an appropriate interface (e.g., by a getDomainPartitionName( )method provided on the service interface).

Cache and Service Provisioning

In some embodiments, one or more data grid services, for example caches and clustered services, can be shared across multiple partitions. Alternatively, the data grid can provide read-shared/write-specific access to data grid services, in which multiple partitions can share an initial set of data, but their subsequent modifications to that data are then isolated from each other.

In accordance with an embodiment, caches can be provisioned with different capacities or expiration policies for different partitions or tenants; or services can be provisioned with different daemon pool capacities, based on configuration information which the data grid container adapter receives from the application server's container.

Figure 8:
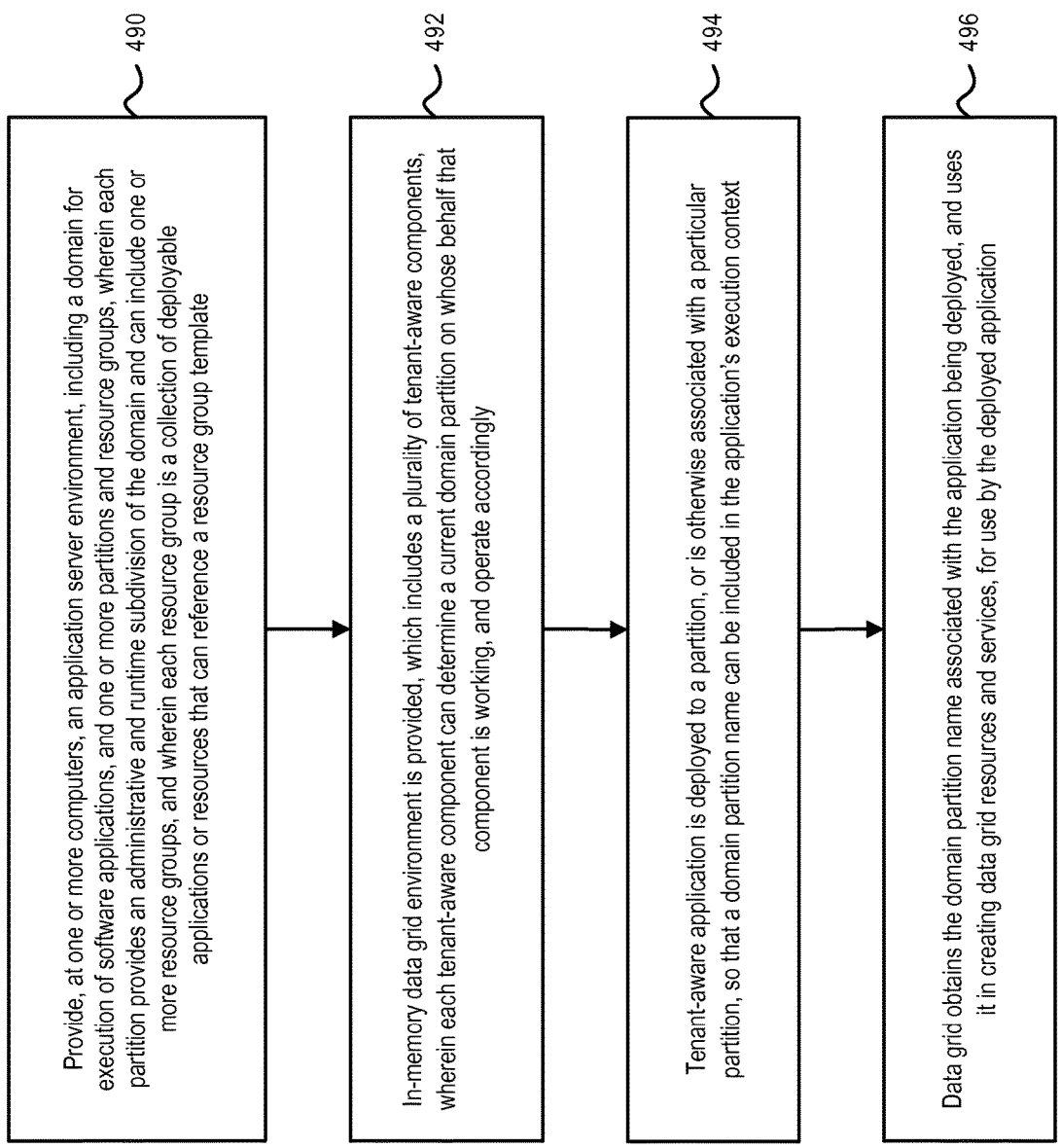
FIG. 8 illustrates a process of using an in-memory data grid with a multitenant application server environment, in accordance with an embodiment.

FIG. 8 illustrates a process of using an in-memory data grid with a multitenant application server environment, in accordance with an embodiment. As shown in FIG. 8, at step 490, an application server environment is provided, including a domain for execution of software applications, and one or more partitions and resource groups, wherein each partition provides an administrative and runtime subdivision of the domain and can include one or more resource groups, and wherein each resource group is a collection of deployable applications or resources that can reference a resource group template.

At step 492, an in-memory data grid environment is provided, which includes a plurality of tenant-aware components, wherein each tenant-aware component can determine a current domain partition on whose behalf that component is working, and operate accordingly.

At step 494, a tenant-aware application is deployed to a partition, or is otherwise associated with a particular partition, so that a domain partition name can be included in the application's execution context.

At step 496, the data grid obtains the domain partition name associated with the application being deployed, and uses it in creating one or more data grid resources and services, for use by the deployed application.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for supporting partitions in an application server environment, comprising:
one or more computers, including an application server environment that provides deployment and execution of software applications, wherein the application server environment includes:

a domain configuration that is used at runtime to define
a domain for execution of software applications, and
a plurality of partitions,
wherein each partition, of the plurality of partitions, is
associated with a partition identifier and a partition
configuration, and provides an administrative and
runtime subdivision of the domain, and
wherein each partition of the plurality of partitions
includes one or more resource groups, and wherein
each partition is associated with a virtual target
information and is accessible via a partition-specific
virtual target associated with the partition at which
that partition accepts incoming traffic to that partition
and its resources; and
wherein the application server environment includes a
data grid module that provides access by an application
container to an in-memory data grid that supports
separation of data associated with different partitions of
the plurality of partitions from each other of the plurality of partitions, including that:
upon a software application being deployed to a particular
partition of the plurality of partitions, or otherwise
associated with the particular partition, a domain partition name associated with the particular partition is
incorporated in an execution context associated with
the software application, and is used by the in-memory
data grid in associating the domain partition name with
a data grid service name and creating one or more data
grid resources and services, for use by the deployed
software application, including that:
the domain partition name is provided by the application container, via the data grid module, to a container adapter at the in-memory data grid, for use in
creating a data grid service for the partition, and
the container adapter injects the domain partition name
into a cache factory, which passes the provided
domain partition name to service builder instances
that modify names of one or more partition-related
data grid resources or services to include the provided domain partition name, wherein the deployed
software application, at the particular partition, uses
the domain partition name to access the partition-related data grid resource and services.

2. The system of claim 1, wherein the system can associate a partition with a tenant, for use by the tenant, wherein the software application is a tenant-aware application, and whereupon the tenant-aware application is deployed to or otherwise associated with the particular partition, the domain partition name is included in the application's execution context, so that data grid tenant-aware components can obtain the domain partition name.

3. The system of claim 1, wherein data grid resources and services are shared across multiple partitions, including domain partition name can be used by the data grid to enable a separation of data between different partitions or between tenants associated with those partitions.

4. The system of claim 1, wherein the data provides read-shared/write-specific access to data grid services, in which multiple partitions can share an initial set of data, but their subsequent modifications to that data are then isolated from each other.

5. The system of claim 1, wherein the system is provided within a cloud environment, to support multiple tenants operating within the cloud environment.

6. A method for supporting partitions in an application server environment, comprising:
providing, at one or more computers, an application
server environment that provides deployment and
execution of software applications, wherein the application server environment includes:
a domain configuration that is used at runtime to define
a domain for execution of software applications, and
a plurality of partitions,
wherein each partition, of the plurality of partitions, is
associated with a partition identifier and a partition
configuration, and provides an administrative and
runtime subdivision of the domain, and
wherein each partition of the plurality of partitions
includes one or more resource groups, and wherein
each partition is associated with a virtual target
information and is accessible via a partition-specific
virtual target associated with the partition at which
that partition accepts incoming traffic to that partition
and its resources; and
providing access by an application container to an in-memory data grid that supports separation of data
associated with different partitions of the plurality of
partitions from each other of the plurality of partitions;
and
upon a software application being deployed to a particular
partition of the plurality of partitions, or otherwise
associated with the particular partition:
incorporating a domain partition name associated with
the particular partition in an execution context associated with the software application, for use by the
in-memory data grid in associating the domain partition name with a data grid service name and
creating one or more data grid resources and services, for use by the deployed software application,
including that:
the domain partition name is provided by the application container to a container adapter at the in-memory data grid, for use in creating a data grid
service for the partition, and
the container adapter injects the domain partition name
into a cache factory, which passes the provided
domain partition name to service builder instances
that modify names of one or more partition-related
data grid resources or services to include the provided domain partition name, wherein the deployed
software application, at the particular partition, uses
the domain partition name to access the partition-related data grid resource and services.

7. The method of claim 6, further comprising associating a partition with a tenant, for use by the tenant, wherein the software application is a tenant-aware application, and whereupon the tenant-aware application is deployed to or otherwise associated with the particular partition, the domain partition name is included in the application's execution context, so that data grid tenant-aware components can obtain the domain partition name.

8. The method of claim 6, wherein data grid resources and services are shared across multiple partitions, including domain partition name can be used by the data grid to enable a separation of data between different partitions or between tenants associated with those partitions.

9. The method of claim 6, wherein the data grid provides read-shared/write-specific access to data grid services, in which multiple partitions can share an initial set of data, but their subsequent modifications to that data are then isolated from each other.

10. The method of claim 6, wherein the method is provided within a cloud environment, to support multiple tenants operating within the cloud environment.

11. A non-transitory computer readable storage medium, including instructions stored thereon which when read and executed by one or more computers cause the one or more computers to perform the steps comprising:
  providing an application server environment that provides deployment and execution of software applications, wherein the application server environment includes:
    a domain configuration that is used at runtime to define a domain for execution of software applications, and a plurality of partitions,
    wherein each partition, of the plurality of partitions, is associated with a partition identifier and a partition configuration, and provides an administrative and runtime subdivision of the domain, and
    wherein each partition of the plurality of partitions includes one or more resource groups, and wherein each partition is associated with a virtual target information and is accessible via a partition-specific virtual target associated with the partition at which that partition accepts incoming traffic to that partition and its resources; and
  providing access by an application container to an in-memory data grid that supports separation of data associated with different partitions of the plurality of partitions from each other of the plurality of partitions; and
  upon a software application being deployed to a particular partition of the plurality of partitions, or otherwise associated with the particular partition:
    incorporating a domain partition name associated with the particular partition in an execution context associated with the software application, for use by the in-memory data grid in associating the domain partition name with a data grid service name and creating one or more data grid resources and services, for use by the deployed software application, including that:
    the domain partition name is provided by the application container to a container adapter at the in-memory data grid, for use in creating a data grid service for the partition, and
    the container adapter injects the domain partition name into a cache factory, which passes the provided domain partition name to service builder instances that modify names of one or more partition-related data grid resources or services to include the provided domain partition name, wherein the deployed software application, at the particular partition, uses the domain partition name to access the partition-related data grid resource and services.

12. The non-transitory computer readable storage medium of claim 11, further comprising associating a partition with a tenant, for use by the tenant, wherein the software application is a tenant-aware application, and whereupon the tenant-aware application is deployed to or otherwise associated with the particular partition, the domain partition name is included in the application's execution context, so that data grid tenant-aware components can obtain the domain partition name.

13. The non-transitory computer readable storage medium of claim 11, wherein data grid resources and services are shared across multiple partitions, including domain partition name can be used by the data grid to enable a separation of data between different partitions or between tenants associated with those partitions.

14. The non-transitory computer readable storage medium of claim 11, wherein the data grid provides read-shared/write-specific access to data grid services, in which multiple partitions can share an initial set of data, but their subsequent modifications to that data are then isolated from each other.

15. The non-transitory computer readable storage medium of claim 11, wherein the method is provided within a cloud environment, to support multiple tenants operating within the cloud environment.

16. The system of claim 1, wherein each application server or data grid component, that performs work on behalf of a tenant, and dispatches work to an other thread, propagates the domain partition name to the other thread, wherein the domain partition name is thereafter accessible via an interface, by other application server or data grid components.

17. The system of claim 1, wherein during an application deployment prepare phase, the domain partition name is provided by the application container, via the data grid module, to a data grid container adapter constructor; and
  wherein during an activate phase, the domain partition name is passed to the service builder instances.

18. The system of claim 1, wherein the virtual target information associated with each particular partition is used to define the partition-specific virtual target for use by that partition, which is then made accessible via a uniform resource locator.

19. The system of claim 1, wherein the plurality of partitions includes:
  a first partition configured to be accessible via a first virtual target; and
  a second partition configured to be accessible via a second virtual target.

20. The system of claim 1, whereupon the system starts the plurality partitions, it creates a plurality of virtual targets associated with the plurality of partitions, including a virtual target for each partition, according to its configuration.

* * * * *

UNITED STATES PATENT AND TRADEMARK OFFICE
CERTIFICATE OF CORRECTION

PATENT NO. : 10,873,627 B2
APPLICATION NO. : 14/748139
DATED : December 22, 2020
INVENTOR(S) : Gleyzer et al.

Page 1 of 1

It is certified that error appears in the above-identified patent and that said Letters Patent is hereby corrected as shown below:

On the Title Page

On page 2, Column 2, under Other Publications, Line 8, delete "pages ." and insert -- pages. --, therefor.

Signed and Sealed this
Fifteenth Day of June, 2021

Drew Hirshfeld
*Performing the Functions and Duties of the*
*Under Secretary of Commerce for Intellectual Property and*
*Director of the United States Patent and Trademark Office*